(12) United States Patent
Arad

(10) Patent No.: US 8,260,820 B2
(45) Date of Patent: Sep. 4, 2012

(54) METHOD AND APPARATUS FOR SEARCHING

(75) Inventor: Saeed Arad, London (GB)

(73) Assignee: Royce Technology Ltd., London (GB)

( * ) Notice: Subject to any disclaimer, the term of this patent is extended or adjusted under 35 U.S.C. 154(b) by 522 days.

(21) Appl. No.: 11/920,272

(22) PCT Filed: May 11, 2006

(86) PCT No.: PCT/GB2006/001720
§ 371 (c)(1), (2), (4) Date: Feb. 29, 2008

(87) PCT Pub. No.: WO2006/120446
PCT Pub. Date: Nov. 16, 2006

(65) Prior Publication Data
US 2009/0055354 A1 Feb. 26, 2009

(30) Foreign Application Priority Data
May 11, 2005 (GB) .................................. 0509625.0

(51) Int. Cl.
*G06F 7/00* (2006.01)
(52) U.S. Cl. ...................................................... 707/802
(58) Field of Classification Search .................. 707/999, 707/802
See application file for complete search history.

(56) References Cited

U.S. PATENT DOCUMENTS

| | | | |
|---|---|---|---|
| 6,490,579 B1 | 12/2002 | Gao et al. | |
| 2002/0010767 A1* | 1/2002 | Farrow et al. | 709/223 |
| 2002/0055932 A1* | 5/2002 | Wheeler et al. | 707/104.1 |
| 2004/0204948 A1 | 10/2004 | Singletary et al. | |
| 2004/0225896 A1 | 11/2004 | Ng | |

FOREIGN PATENT DOCUMENTS

| | | |
|---|---|---|
| WO | WO 01/08051 | 2/2001 |
| WO | WO 01/75728 | 10/2001 |
| WO | WO 02/25550 | 3/2002 |
| WO | WO 2004/111866 | 12/2004 |

OTHER PUBLICATIONS

L. Gravano et al., "*STARTS*: Stanford Proposal for Internet Meta-Searching", Stanford University, pp. 207-218, 1997.

(Continued)

*Primary Examiner* — Truong Vo
(74) *Attorney, Agent, or Firm* — Dickstein Shapiro LLP

(57) ABSTRACT

A method of searching data on heterogeneous databases connected over a network. Configuration data representing the configuration of each database is received. The configuration data includes mapping data associating search terms to data field names in each database. A search request specifying criteria for a search term for data is received from a client. The mapping data is processed to select a data field name in a database, the data field name corresponding to the search term specified in the search request. A search command is generated which is compatible with the database using the data field name. The search command is transmitted to a data provider system associated with the database. Search results are received from the data provider system, which results from the execution of the search command on the database. The search results are processed to generate search report data, and are transmitted to the client terminal.

37 Claims, 10 Drawing Sheets

OTHER PUBLICATIONS

Jian Liu, "Guide to Meta-Search Engines" Reference Department, Indiana University Libraries, jiliu@indiana.edu, URL: http://www.indiana.edu/~libresd/search/meta.html. Last Update: Jun. 1999.

C. Chang et al., : Predicate Rewriting for Translating Boolean Queries in a Heterogeneous Information System ACM Transactions on Information Systems, ACM USA, vol. 17, No. 1, pp. 1-39, Jan. 1999.

* cited by examiner

METHOD AND APPARATUS FOR SEARCHING

The present invention provides a method and apparatus for searching for data on a plurality of heterogeneous databases. It has particular application in the field of job recruitment.

Databases have been under development for many decades, and many advances and improvements have been made with respect to techniques for managing, structuring and accessing databases. Accordingly there now exist a very wide range of database systems and formats in use.

In some fields, there has been an active effort to centralise and homogenise database systems and structures. In others, such developments have been hindered, for example because of a willingness to retain control over proprietary systems and rights. In the field of recruitment, for example, a recruitment agent typically maintains a list of prospective job candidates who have previously supplied their details to the agency. This list may be provided in physical files, in a single document or, more commonly, in a database. The recruitment agent derives considerable value from the information contained within the list of job candidates, and so the full details of the list are usually maintained in strict confidence. For reasons such as these, centralisation or standardisation of database formats is often discouraged.

Accordingly, there is often a need to conduct searches on a plurality of heterogenous databases, and often such searching may be restricted in various ways by the data provider associated with each database. Again in the field of recruitment, for example, if an employer wishes to conduct a wide search for candidates suitable for a particular position, the employer must carry out multiple searches on multiple, proprietary (heterogeneous) databases, each typically using a proprietary (heterogeneous) search interface. If the employer then finds candidates which appear to be suitable for the position being filled, there is no standard protocol which exists for conducting a transaction between the employer and each relevant recruitment agency in respect of the selected candidates.

In the light of these and other problems identified in the prior art, one aspect of the present invention provides a method of facilitating searching for data on a plurality of heterogeneous databases connected over a network, the method comprising: receiving configuration data representing the configuration of each database; receiving from a client terminal a search request for data meeting specified criteria; for each of at least one database selected from the plurality of databases: processing the received search request and the configuration data to generate a search command compatible with the selected database; transmitting the search command over the network to a data provider system associated with the selected database; and receiving over the network from the data provider system search results resulting from the execution of the search command on the database; processing the search results received from selected database to generate search report data, and transmitting the search report data to the client terminal. The method may also include receiving the configuration data via the network.

This can allow a searcher to search more than one database with a single search request, and can furthermore allow all searching to be carried out using a single, common format and/or a single web page. Clearly this can increase the ease and speed of searching.

It will be appreciated that the present method can be used with databases yielding 'anonymous' search results, and the provision of a more indirect link between a client terminal and databases which the client terminal wishes to search assists in maintaining the anonymity of returned search results. The databases may be of any type, such as conventional table-based databases or object-oriented databases (where different classes of object represent different data types and/or records). It will also be appreciated that no further constraints are necessarily imposed on data providers; the data providers may thus use diverse system configurations and different models of operation. For example, the searching may be adapted to accommodate different properties of the data providers such as bandwidth, searching speed and so on (the searching may occur in realtime, or with a minimal delay of seconds, for example, or it may take considerably longer). Thus the search report may be transmitted to the client terminal once all search results have been received, or after fewer than all of the search results have been received (for example if one search is taking longer than a predetermined length of time).

In the field of job recruitment, for example, the data providers may be recruitment agencies with or without a web presence and with or without externally searchable databases. In some embodiments, database searching may be provided via a further intermediary or using non-electronic means (such as a telephone, e-mail or fax request to some or all of the data providers, for example). In more detail, the data provider may not be the original provider of the data; that is, in the field of recruitment, the data provider may be a 'third party' database operator, for example, maintaining a database on behalf of a recruitment agent (which may be provided at a different physical and/or network location) and occasionally receiving (electronically or otherwise) updates of data from the recruitment agent, for insertion into the 'local' database. In this example, the 'local' database would mirror the data held by the recruitment agent to a (chosen) greater or lesser extent, and searching efficiency can be improved by the use of such a cached data source.

The method may further comprise receiving (for example via the network) at least one portion of the configuration data from a corresponding at least one of the data provider systems. The configuration data may further comprise a portion relating to each data provider system, and each such portion may be received from the respective data provider system, for example via a web registration form or other input means.

If the databases include at least one named data field and the search request specifies criteria for at least one predefined search term, the step of generating a search command for selected database may further comprise processing mapping data included in the configuration data, which mapping data associates predefined search terms to specific data field names in each database, to select at least one data field name in selected database corresponding to predefined search term specified in the search request, and generating the search command for selected database using selected data field name. In the field of recruitment, for example, the predefined search terms could be predefined candidate characteristic such as education and qualifications, professional experience and skills, language skills, availability, date of birth, and so on. The use of mapping data associating predefined search terms (such as candidate characteristics) to specific field names in each database provides a flexible, yet simple means for providing compatibility with the plurality of databases.

The method may further comprise receiving further configuration data in respect of a further database, storing the further configuration data, and including the further database in the plurality of databases. The configuration data may include mapping data associating search terms to specific named data fields in the further database. The further mapping data may be used in the same way as the mapping data as aforesaid, and the further database may be treated as any of the previous plurality of databases. This provides a flexible and systematic method for expanding the search and adding data providers to the searching system.

At least one of the step of selecting at least one database and the step of generating a search command for selected database may further comprise retrieving the configuration data from a configuration database containing a plurality of records, each record containing configuration data relating to a data provider system associated with one of the plurality of databases. The method may further comprise the steps of processing the search request received from the client terminal to determine criteria which data provider systems must meet; and selecting at least one database from the plurality of databases in dependence on whether respective associated data provider system meets the determined criteria, wherein said search commands are transmitted (preferably, but not necessarily, only) to data provider systems which meet the criteria. The criteria may include geographical coverage and data specialisations, for example, so that in the field of recruitment, say, search commands for accountants would not be transmitted to recruitment agencies specialising in secretarial staff, or search commands to fill a job vacancy in London would not be sent to recruitment agencies in Spain. This can reduce the total number of search requests sent over the network, and thus reduce the amount of network traffic overall.

The step of converting the received search request to a search command for selected database may comprise building a search string, including a network address for accessing the or each selected database and a set of search terms, by which method a conventional HTTP/WWW framework may be used to transmit and receive the search command, avoiding the need to use proprietary network protocols, for example. The step of receiving search results from the data provider system may comprise receiving at least one document and the step of processing the search results may further comprise scanning the or each document for at least one tag identifying the position of at least one respective type of result data. The tag may be an XML node, for example, or a similar data structure. The step of processing the search results may comprise extracting result data from marked-up portions of the or each document. The search results returned by the data provider systems may be presented in the form of HTML documents, for example, and may, for increased simplicity, use existing web-based search interfaces. The use of tags, and an HTML or XML format in particular, allows flexibility in the output format of the search results, and can also allow the search results to be directly viewable in an HTML or other browser.

The method may further comprise processing tag mapping data, associating predefined search terms with specific tags used by each respective data provider system, to select the or each mark-up tags for scanning the or each document. The tag mapping data may be the same as (or a copy of) the aforesaid mapping data associating predefined search terms to specific fields in the data provider system database, or it may be different. Thus, (for convenience and interoperability) the search results may use the same field names as the search commands, or (for flexibility) they may use different field names.

The step of processing the search results may comprise aggregating the or each received search results into a single set of search results, and may further comprise sorting the set of search results in accordance with sorting criteria (a specific data field, for example, such as age or proximity to a particular location, in the context of recruitment data), preferably as specified by the user. The sorting may occur under the control of the search broker system or under the control of the client terminal, or otherwise. The aggregated search results may also be converted, as appropriate, into a single format. By aggregating—and, optionally, formatting and sorting—the received search results, the results can be more easily viewed and processed by the client terminal. The results may also be processed to remove duplicate records or non-anonymous data.

The step of processing the search results may comprise inserting the search results into a mark-up language document. For example, the results can be presented in an HTML document, which may be transmitted to the client terminal using a web server or the like. This can allow the user to obtain and view the search results using standardised communications programs or browsers. The generated search report data may include formatted lists of records (such as candidate details, if the data relates to recruitment information for example), and may contain code (such as Javascript) to perform client-side sorting of the result data, for example.

The method may further comprise the steps of receiving, from the client terminal, selection data relating to at least one record associated with the search report data transmitted to the client terminal; processing the selection data to determine at least one data provider system associated with the or each record; transmitting identifying data to one of the client terminal and the or each data provider system, the identifying data allowing the client terminal and the or each data provider system to communicate directly with regard to records selected from the database associated with the or each respective data provider system. If the records relate to prospective job candidates, for example, this method can provide a standardised protocol for introducing potential employers to relevant recruitment agents, without significant effort on the part of the recruitment agents, and also without requiring (up to that point) identifiable information to be divulged regarding the selected candidates.

The step of receiving search results from the data provider system may further comprise receiving record identifiers, unique within the database associated with the data provider system, and wherein the identifying data includes the or each record identifier for the relevant data provider system. If the records relate to prospective job candidates, for example, this can provide a simple means of retaining the anonymity of the selected candidates, whilst still allowing such candidates to be uniquely identified by a recruitment agent responsible for the candidate record in question.

If the step of receiving search results from the or each data provider system further comprises receiving a plurality of data fields in respect of each record, and the search report data transmitted to the client terminal contains only a subset of the data fields, the method may, accordingly, further comprise receiving a request from the client terminal for further information about at least one record; generating a further report containing at least one data field absent from the first search report data; and transmitting the further report to the client terminal. This can allow the initial search report data to be compact and concise, even if the raw search results are not.

The method may further comprise storing the received search results as records in a database, each record relating to a specific received record and including a record identifier for the received record and a data provider system identifier. This can allow any number of requests for further information regarding the search results (such as the requests mentioned above) to be handled by accessing the database, rather than requiring the data provider systems to retransmit the search results.

The method may further comprise receiving a request for data, the request including criteria for the data; selecting at least one data provider system from the plurality of data provider systems associated with the respective plurality of databases; and transmitting the request for data to the or each selected data provider system. By use of the existing infrastructure for searching for data, requests for data (such as job advertisements seeking prospective job candidates, for example) may be efficiently distributed. E-mail servers may be used to distribute the requests for data (such as advertisements) in the form of e-mails sent to relevant data providers (such as recruitment agents), although other protocols (such as instant messaging, HTTP, and so on) may of course be employed. As will be appreciated, these important features may also be provided independently. The method may further comprise monitoring the response to the request for data, and for retransmitting the request in accordance with a predetermined transmission schedule and/or specified expiry date.

In another aspect of the present invention, there is provided apparatus for facilitating searching for data on a plurality of heterogeneous databases connected over a network, the apparatus comprising: means for receiving configuration data (such as a network interface) representing the configuration of each database; means for receiving (such as the same or a further network interface) from a client terminal a search request for data meeting specified criteria; means for processing the received search request and the configuration data to select at least one database from the plurality of databases and to generate a search command compatible with the or each selected database; means for transmitting the or each generated search command over the network (such as the same or a further network interface) to the or each respective data provider system associated with the or each respective selected database; means for receiving over the network from the or each data provider system (such as the same or a further network interface) search results resulting from the execution of the search command on the or each database; means for processing the search results received from the or each selected data provider system to generate search report data; and means for transmitting the search report data to the client terminal (such as the same or a further network interface). There may also be provided an instruction memory, a processor operable to execute code stored in the instruction memory, an e-mail server and/or client, a web server, any number of separate or collective databases for storing web page code (such as Javascript and/or Java), received search results, configuration data relating to individual data provider systems and/or associated databases, and e-mail templates. The instruction memory may contain a control application for overseeing the overall operation of the apparatus as aforesaid.

In a further aspect of the invention there is provided apparatus for searching for data on a plurality of heterogeneous databases connected over a network, the apparatus comprising: a data memory operable to store data to be processed; an instruction memory storing processor implementable instructions; a processor operable to read and process the data in accordance with instructions stored in the instruction memory; and a network interface device; wherein the instructions stored in the instruction memory comprise instructions for controlling the processor to perform a method as aforesaid.

The present invention may provide a client terminal, which may contain a processor and program instruction memory containing instruction code for controlling the processor to perform a method compatible with the method as aforesaid, and to receive and process search report data relating to search results obtained from multiple heterogeneous databases. The apparatus may further be adapted to transmit a request for further details about selected result data. Further features may be provided in accordance with corresponding features of the apparatus for facilitating searching as aforesaid.

The present invention may further provide a data provider apparatus and associated database, which apparatus may contain a processor and program instruction memory containing instruction code for controlling the processor to perform a method compatible with the method as aforesaid and, in particular, to receive and process a search command for searching for data in the database, to execute the search command in relation to the database, and to transmit search results generated by the execution of the search command. Further features may be provided in accordance with corresponding features of the apparatus for facilitating searching for prospective job candidates as aforesaid.

In another aspect of the invention, there is provided a method of searching for job candidates, comprising receiving from a potential employer a request to find a candidate matching specified criteria; transmitting the request to a plurality of recruitment agents; receiving from said recruitment agents anonymous information relating to candidates in their records who meet the specified criteria; transmitting the anonymous information to said potential employer; receiving a selection of candidates from said potential employer based on said anonymous information; and transmitting to at least one of said potential employer and at least one of said recruitment agents further anonymous information including at least one identifier allowing said potential employer and at least one of said recruitment agents to communicate directly with regard to the selected candidates. This can provide an efficient method of searching for job candidates which respects the anonymity of the candidates which are the subject of the searching.

In a further aspect of the invention there may be provided at least one signal tangibly embodying data (or sets of data) generated in accordance with a method as aforesaid.

This aspect of the invention may be provided in conjunction with other method and apparatus aspects as aforementioned.

The present invention can be implemented in any convenient form, for example using dedicated hardware, or a mixture of dedicated hardware and software. The present invention is particularly suited to implementation as computer software implemented by a network of processing apparatuses. The network can comprise any conventional terrestrial or wireless communications network. The processing apparatuses can comprise any suitably programmable apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional non-transient storage medium for storing processor readable code such as a floppy disk, hard disk, CD ROM, magnetic tape device or solid state memory device.

The present invention can be implemented in any convenient form, for example using dedicated hardware, or a mixture of dedicated hardware and software. The present invention is particularly suited to implementation as computer software implemented by a network of processing apparatuses. The network can comprise any conventional terrestrial or wireless communications network. The processing apparatuses can comprise any suitably programmable apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Although each aspect and various features of the present invention have been defined hereinabove independently, it will be appreciated that, where appropriate, each aspect can be used in any combination with any other aspect(s) or features of the invention.

Embodiments of the present invention will now be described with reference to the accompanying drawings, in which.

A first embodiment of the invention, comprising a searching system for facilitating the searching of a plurality of internet-based heterogeneous databases, with particular application to the field of recruitment, will now be described.

Figure 1:
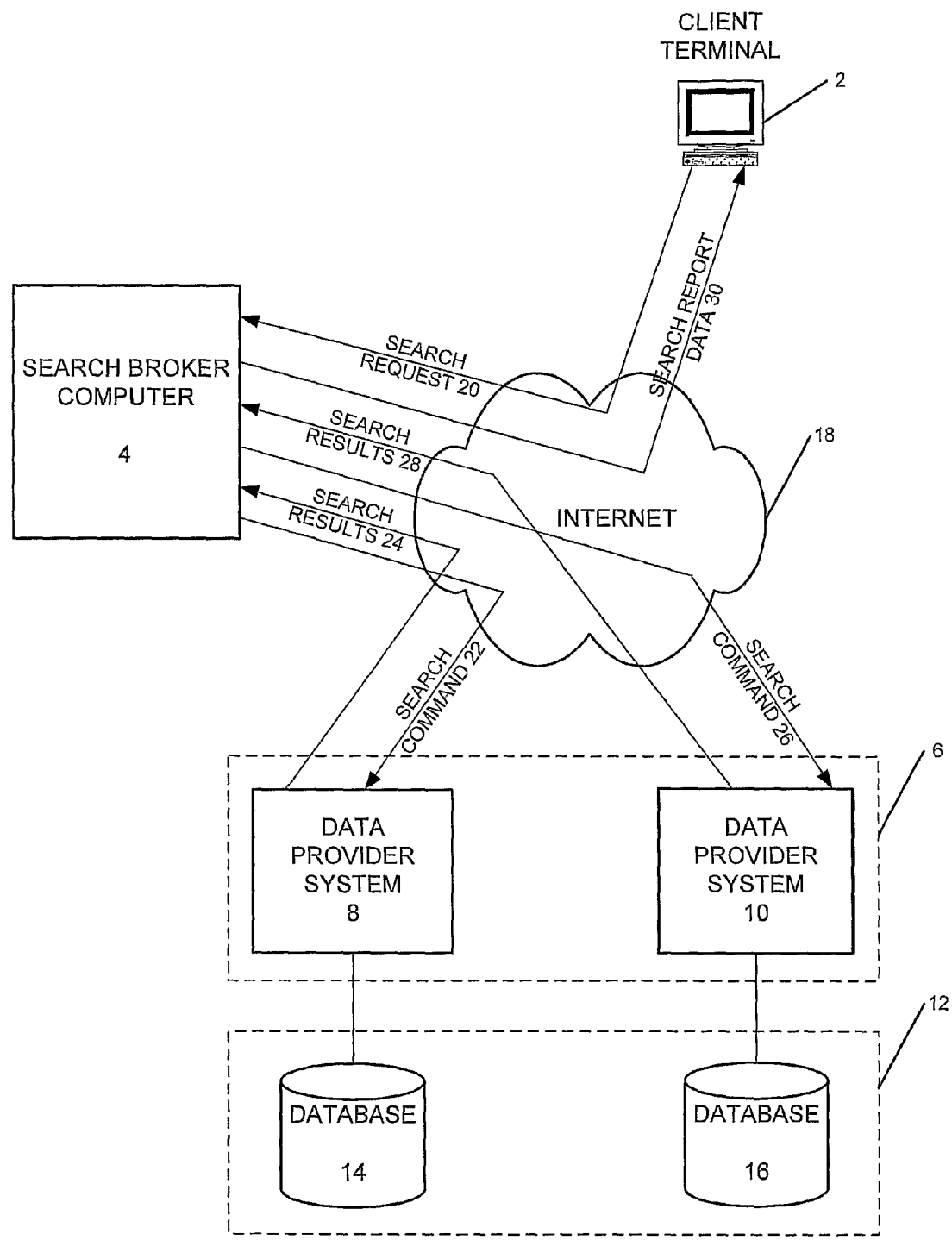
FIG. 1 is a schematic diagram of a searching system in accordance with an embodiment of the present invention.

FIG. 1 is a schematic of the overall searching system, showing a client terminal 2 (operated by a potential employer), a search (recruitment) broker 4 (providing a recruitment searching service), and a plurality 6 of data provider systems 8, 10 (such as recruitment agencies and the like) each operating a plurality 12 of proprietary recruitment databases 14, 16. The client terminal, search broker and recruitment data provider systems are linked together by the Internet 18.

In use, the client terminal 2 (operated by a potential employer) transmits a search request 20 to the search (recruitment) broker 4, containing criteria which a desired prospective job candidate must meet. The recruitment broker processes a list of (recruitment) data provider systems which are registered with the service to determine a subset 6 of the data provider systems 8, 10 which meet certain of the relevant criteria, namely the location(s) (region or country) and the professional specialisation(s) (such as legal, I.T., secretarial, and so on) in which the search is to be conducted.

For each of the selected (recruitment) data provider system 8, 10, the search (recruitment) broker generates a customised search command 22, 26 appropriate for the format and content of the relevant proprietary (heterogeneous) database 14, 16, and transmits each such search command 22, 26 to the relevant data provider system 8, 10.

Each data provider system 8, 10 then executes a query on the relevant database 14, 16 using the supplied search commands 22, 26, and returns the subsequent search results 24, 28 to the broker 4 in an appropriate format. Each data provider system executes searches independently of any other, and thus the returned search results 24, 28 are not necessarily returned in any particular sequence or timing. Thus the search may be essentially realtime, if (for example) the processing power and network connections of the data provider systems meet the necessary criteria.

The broker 4 then processes the returned search results 24, 28 to create search report data 30, and transmits the search report data 30 to the client terminal 2.

The client terminal 2 can then take further steps in relating to the search report data 30 in order to follow-up the details of any records (such as particular candidates) included in the search report data 30, as described in more detail later.

By returning search report data in response to a single search request issued by the client terminal, the operator of the client terminal is given the appearance of a single search being conducted on a single, standardized database.

Figure 2:
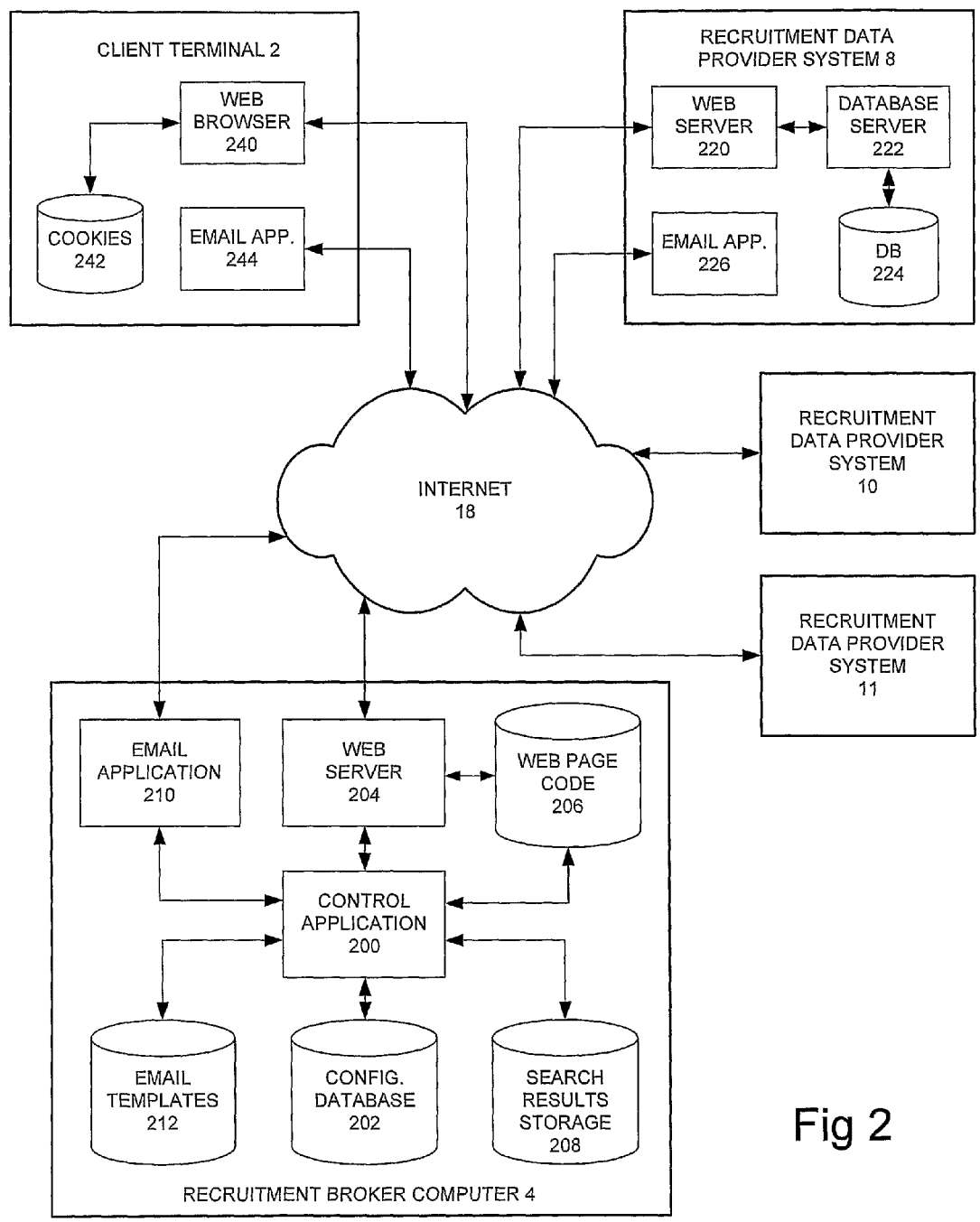
FIG. 2 is a schematic diagram of the principal components of a recruitment searching system based on the system shown in FIG. 1.

With reference to FIG. 2, the system architecture of the recruitment searching system will now be described in more detail.

In FIG. 2, the client terminal 2, recruitment broker 4, and a plurality of recruitment data provider systems (including providers 8, 10, 11) interconnected by the Internet 18 are again shown.

The recruitment broker 4 system includes a control application 200, a configuration database 202, a web server application 204, web page code (such as Java®) 206, search results storage 208, an e-mail application 210, and a set of e-mail templates 212. The control application 200, web server application 204 and e-mail application 210 may be implemented using any suitable hardware, such as a processor and associated instruction memory storing the code operable to provide the services of the above-mentioned applications 200, 204, 210. The databases and storage devices 202, 206, 208, 212 may be provided as separate devices, or combined in single storage devices (such as hard disks or flash memory, for example). A network interface (not shown) for connecting to the Internet 18 is also provided.

The client terminal 2 includes a web browser 240 with associated memory 242 for storing browser cookies. An e-mail application 244 is also provided. Again, the web browser 240, memory 242 and e-mail application 244 may be provided on any suitable hardware, such as a computer with processor and associated instruction and data memories. Again, a network interface (not shown) is provided for connecting to the Internet 18.

The recruitment data provider system 8 includes a web server 220, database server 222, a database 224 storing recruitment data, and an e-mail application 226. The various components may be provided in one or several computers, for example, using appropriate hardware as mentioned above. The web server 220, database server 222 and database 224 may be provided as separate entities, or combined to any appropriate extent. Again, at least one network interface (not shown) is provided. Comparable systems are provided by every other recruitment data provider system (including provider 10).

The operation of the systems mentioned above, particularly with regard to the recruitment broker 4, will now be described in more detail with reference to FIGS. 3 to 7.

Figure 3:
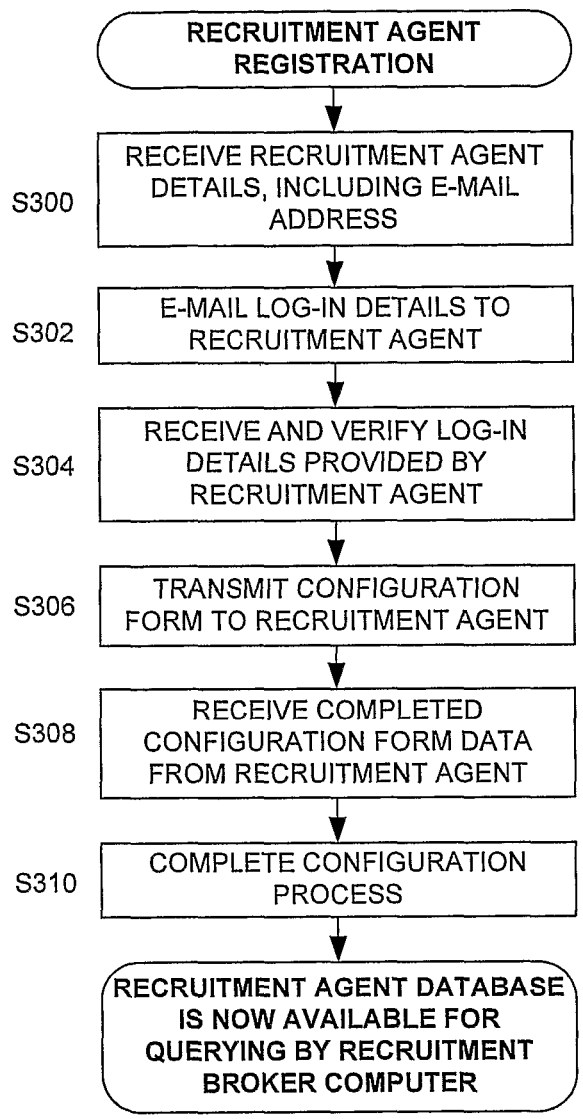
FIG. 3 is a flow diagram illustrating the process of registering a recruitment agent in the recruitment searching system.

FIG. 3 details the process for registering a recruitment agent/data provider with the recruitment broker 4. Registration is undertaken before any searches are conducted on a recruitment agent's database. In step S300, the recruitment broker receives preliminary details about the recruitment agent, including a contact e-mail address. Log-in details are then e-mailed to the recruitment agent (step S302), and the recruitment agent then logs-in (step S304). This process ensures that a valid e-mail address is provided by the recruitment agent, and allows certain verification to be undertaken before the registration continues. In step S306 a configuration form, which may be a standard web form, is transmitted to the recruitment agent. The agent then completes and returns the form (step S308), and the configuration process is completed (step S310), as described in more detail below. The recruitment agent database is now registered and available for inclusion in any further recruitment searches undertaken by the recruitment broker.

Figure 4:
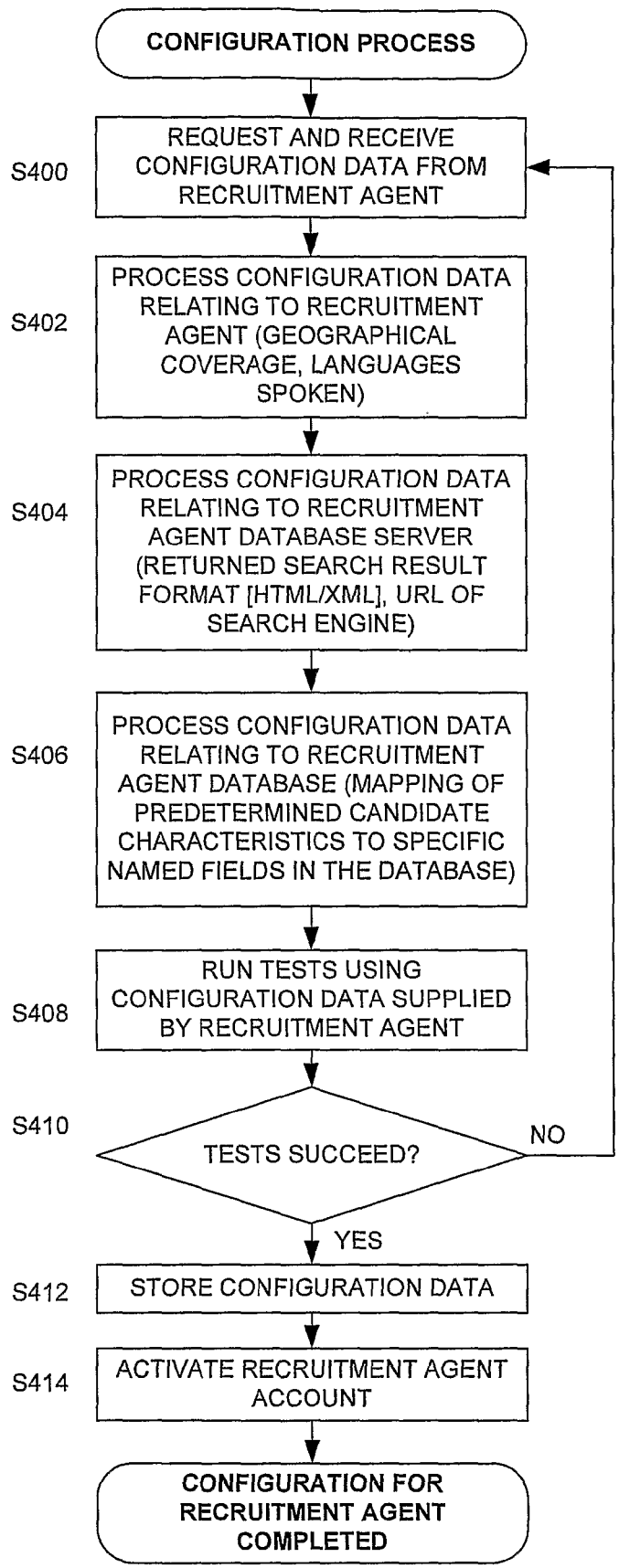
FIG. 4 is a flow diagram illustrating the process of configuring the recruitment searching system in relation to a particular recruitment agent.

FIG. 4 shows the recruitment agent registration/configuration process (corresponding to steps S308 and S310 of FIG. 3) in more detail. In step S400, the recruitment broker requests and receives configuration data from the recruitment agent (by transmitting a blank configuration web form mentioned above and receiving a completed form, for example). In step S402, configuration data relating to the recruitment agent itself is processed, for example to establish the geographical coverage offered by the agent and languages spoken by the agency staff; this recruitment agent-specific data is used in the selection process to determine which of the registered recruitment data provider systems a search commands should be sent to, for example. In step S404, configuration data relating to the recruitment agent database server is processed, for example to establish the Internet address of the database server, the format of search commands sent to the server, and the format of returned search results. In step S406, configuration data relating to the recruitment agent database itself is processed, for example to establish the mapping of standard predetermined field names (such as date of birth, experience, qualifications, languages spoken, and so on) relating to prospective job candidates to specific named fields in the relevant database (where applicable). Tests are then run (step S408) using the received and processed configuration data, to validate the configuration data and to verify that the database can be accessed. The outcome of the tests is then considered (step S410)—if the tests fail, the recruitment agent is prompted to re-enter or to amend the configuration data (step S400); otherwise the configuration data is stored (step S412) in the configuration database 202, and the recruitment agent's account is activated (step S414). The recruitment configuration process is then complete; if necessary the configuration details may be amended at a later date.

Figure 5:
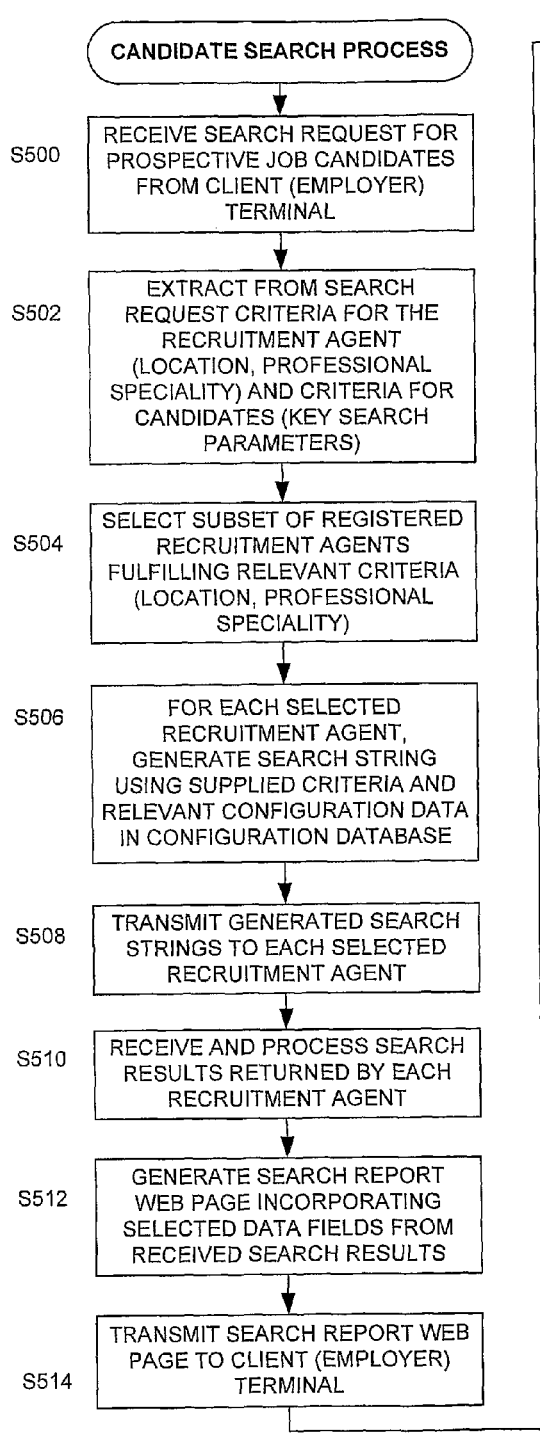
FIG. 5 is a flow diagram illustrating the principal steps undertaken during a recruitment search.
Figure 5:
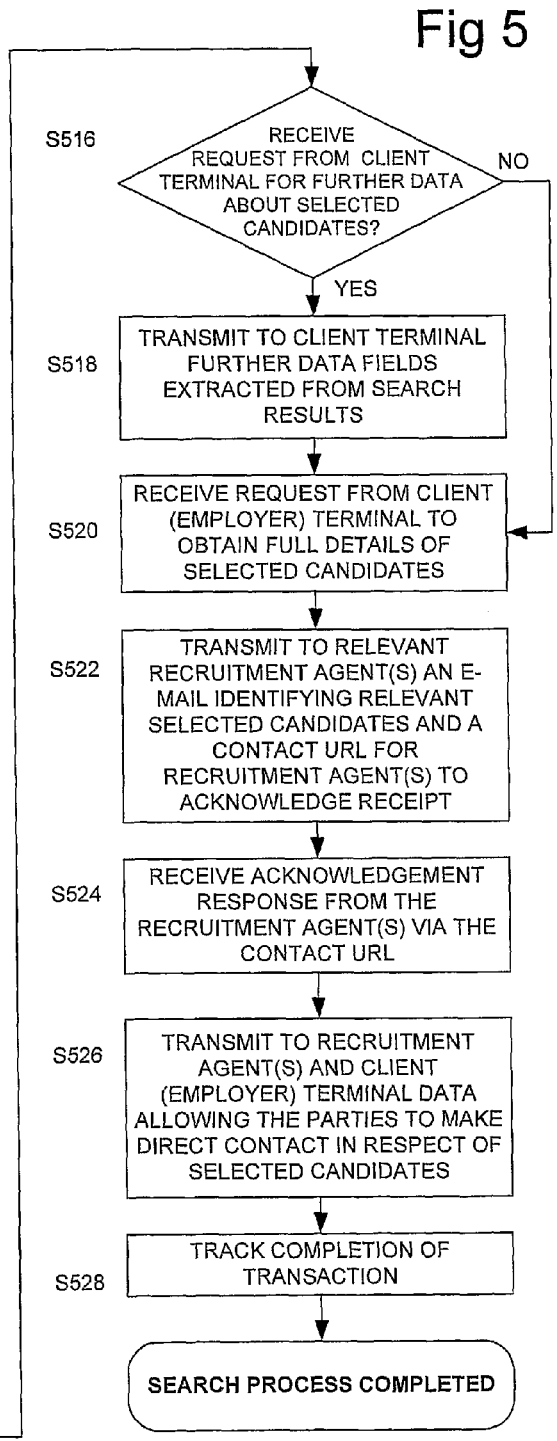

FIG. 5 outlines the main search process, where the recruitment broker 4 undertakes a search for prospective job candidates on behalf of a potential employer using a client terminal 2. In step S500, the recruitment broker receives a search request for prospective job candidates from the client terminal (operated by the potential employer). The broker 4 extracts from the search request (step S502) the criteria to apply to the recruitment agents (namely, geographical location/coverage, professional specialty, and so on) and also criteria to apply to the prospective job candidates (in the form of key search parameters and values, ranges, and so on with which they must comply). The broker then selects a subset of the registered recruitment agents (step S504) which fulfill the relevant criteria specified in the search request; for example, if the search request is directed to candidates to fill a position in Western Europe, recruitment agents in England and France may be selected, whereas recruitment agents in the United States may not be, depending on the coverage specified by the relevant recruitment agents when they registered.

In step S506, the broker generates a search string for each selected recruitment agent, using the criteria supplied in the search request and the configuration data relating to each respective selected recruitment agent (stored in the configuration database). The search strings are then transmitted to each respective agent (step S508) for execution on the associated recruitment databases. The search results are then received and processed by the broker (step S510), and then used to generate a search report web page (step S512) incorporating selected data fields from the received search results; for example, the search results may include data fields relating to date of birth, professional qualifications, geographical location, relevant experience, availability, and so on, and the search report web page may contain information relating to professional qualifications and relevant experience only, so as to provide a concise summary of the received search results. The search report web page is then transmitted to the client terminal (step S514) for evaluation by the potential employer. Optionally, the employer may send a request for further data about candidates selected from the total list of candidates contained in the search report web page (step S516); in return, the broker transmits (step S518), in respect of the selected candidates, the remaining data fields which were included in the received search results but not incorporated in the (summary) search report web page; alternatively the search report web page may contain all relevant information, and steps S516 and S518 need not be provided.

Should the potential employer wish to proceed with any of the candidates contained in the search report data, a request is transmitted to the broker in respect of such candidates (step S520). The broker then transmits (step S522) to the recruitment agent(s) handling the selected candidates an e-mail (such as an e-mail) identifying the relevant candidates and a contact URL, unique for the particular search and also unique for each recruitment agent, to allow the recruitment agent(s) to confirm receipt of the e-mail and to acknowledge the request for further details about the selected candidate(s). When an acknowledgement response is received (step S524), the broker transmits (step S526), to the recruitment agent and to the client terminal, data (such as an e-mail) allowing the parties to make direct contact in respect of the selected candidates. Up until this step (S526), communication regarding the candidates of interest is anonymous, since no identifying information is transmitted to the client terminal regarding any candidate. Further, non-anonymous (identifiable), data regarding specific candidates is then only disclosed directly by the relevant recruitment agent, as they see fit. Subsequently, in step S528, the broker tracks the completion of the transaction, for example submitting questionnaires to the potential employer (via the client terminal) and/or the recruitment agent(s) to ensure customer satisfaction and to monitor the reliability of either party.

Billing may also take place at this stage, or at any other stage in the procedure, in accordance with the business model chosen by the broker.

With reference to FIG. 2, when the broker receives search results from the recruitment data provider systems/agents, the search results storage area 208 is used to cache the search results locally, allowing further/modified search reports to be generated on request in relation to the original search, without requiring the searching to be undertaken again on the relevant databases. Also, when transmitting e-mails, the broker system may access the e-mail templates 212 to create appropriately customised e-mails. The cookies 242 in the client terminal 2 are used to track the selections made by the potential employer using the client terminal, and to generate the requests for further information about the selected candidates. The web page code 206, served to the client terminal 2 by the web server 204, generates the necessary requests regarding selected candidates when it is executed by the web browser 240 running on the client terminal 2.

Figure 6:
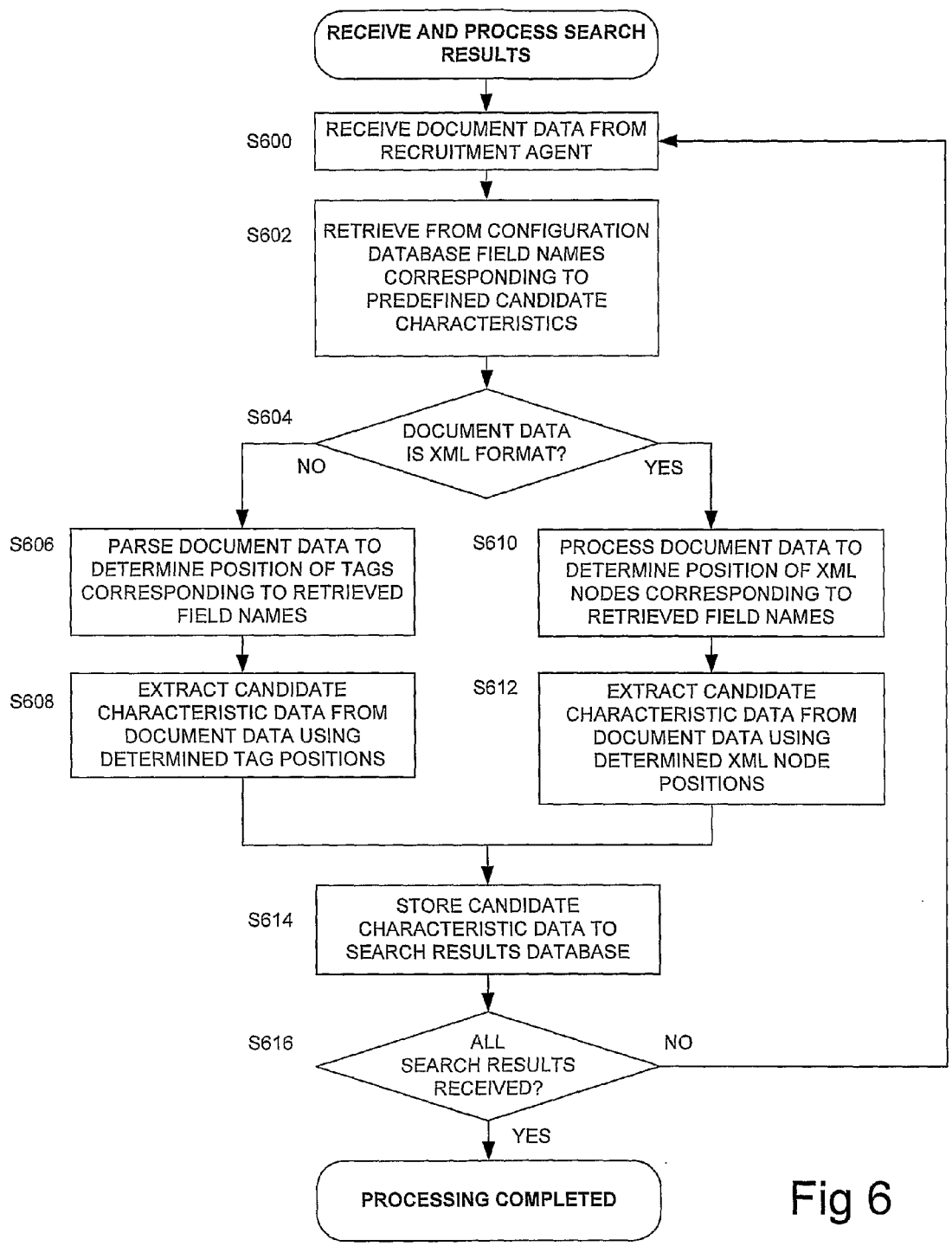
FIG. 6 is a flow diagram illustrating the steps involved in receiving and processing search results received from recruitment agents.

FIG. 6 provides further information on the steps of receiving and processing the search results returned by the recruitment data provider systems/agents (corresponding to step S510 in FIG. 5, mentioned above). In step S600, document data is received from a recruitment agent via the web server 204 or e-mail application 210, in response to the transmittal of search commands to the agent. The broker then retrieves from the configuration database 202 (storing details in respect of each recruitment agent) a list of field names used in the document which correspond to predefined candidate characteristics (such as date of birth, qualifications, experience, and so on). Further configuration data, for example specifying search result data formats used by the recruitment agent in question, may also be retrieved. In step S604, the broker determines whether or not the document data is provided in XML (extensible mark-up language) format—for example by consulting the entry in the configuration database for the relevant recruitment agent.

If the received document data is not in XML format (for example if it is an HTML document), the broker system parses the document data to determine the position of tags (such as HTML tags) corresponding to the retrieved field names (which may or may not be the same as the field names used to generate the search command for the recruitment agent in question). Candidate characteristic data is then extracted from the document data using the determined tag positions (step S608). If, alternatively, the document is indeed in XML format, the broker processes the document data (step S610) to determine the position of XML nodes corresponding to the field names (as retrieved from the configuration database), and then extracts the candidate characteristic data from the document data using the determined XML node positions (step S612). The candidate characteristic data is then stored in the search results database 208, optionally in addition to the raw received search result data, although the candidate characteristic data may be extracted from the received search results as and when required ('on-the-fly') in accordance with steps S606-S612.

If all of the search results are received (step S616), the processing is completed, and the searching procedure continues (to step S512 of FIG. 5, for example). Otherwise, the broker continues to wait for further document data from other recruitment agents to be received (S600); the recruitment broker may undertake other tasks, such as other recruitment searches conducted in parallel, in the meantime, however. Further steps may be undertaken (such as time-out checks, retransmissions of search commands, and so on) to provide for a failure to receive search results from one or more recruitment data provider systems/agents, for example due to equipment failure or a communications error.

Figure 7:
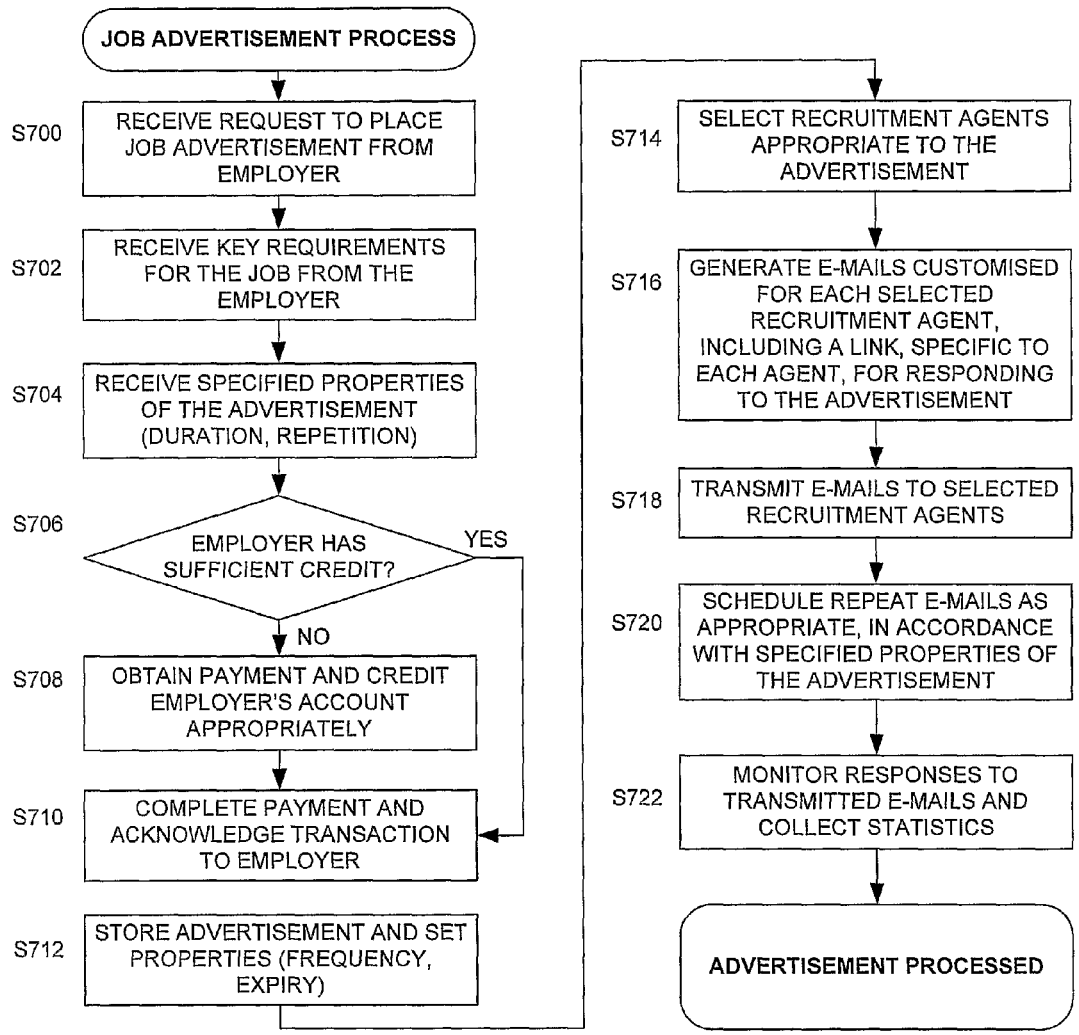
FIG. 7 is a flow diagram illustrating the process of receiving and distributing a job advertisement within the recruitment searching system.

FIG. 7 illustrates a process of placing a job advertisement, using the existing recruitment search infrastructure described above. In step S700, the broker 4 receives a request from a potential employer to place a job advertisement. The broker receives from the employer information regarding key requirements for the job to be advertised (step S702), and also receives (step S704) information regarding specific properties of the advertisement (such as its duration, repetition, cost, and so on). In step S706, the broker checks to see whether the employer has sufficient credit. If not, the broker obtains (step S708) payment from the employer, and credits the employer's account appropriately. In step S710, the broker completes the payment transaction and provides an acknowledgement to the employer. The broker then stores (step S712) the advertisement (for example, using an optional advertisement database, or in another storage device) and sets properties relating to the frequency and expiry of the advertisement (for example in accordance with the properties specified in step S704). The broker then selects (step S714) recruitment agents appropriate to the advertisement, for example on the basis of geographical location or professional specialisation of the agents. E-mails are then generated (step S716), for example using the e-mail templates 212, customised for each recruitment agent selected in step S714; the e-mails include a link, unique for each advertisement and also unique to each agent, for responding to the advertisement (so that the responses can be tracked appropriately). In step S718, the e-mails are transmitted to the relevant agents. Repeat e-mails are scheduled (step S720) as appropriate, in accordance with the specified advertisement properties. The broker subsequently monitors the responses to the transmitted e-mails and collects statistics (for example, assisting billing and budgeting processes).

An example of typical data transmissions between the client terminal 2, recruitment broker 4 and recruitment data provider systems 8, 10 will now be described, with reference to FIG. 8.

Figure 8:
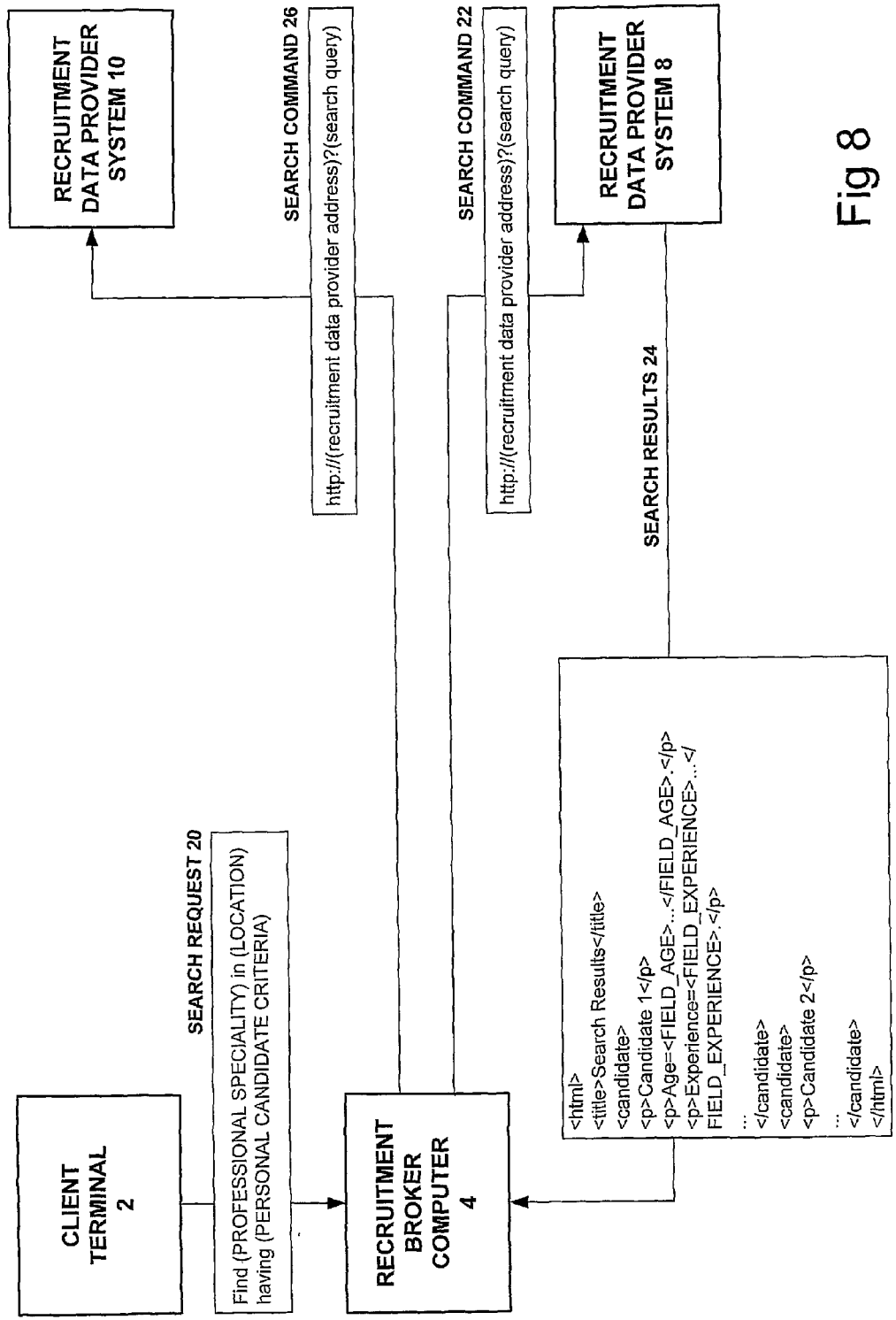
FIG. 8 is an illustration of example search requests, search commands and search results transmitted within the recruitment searching system.

In FIG. 8, as previously described, the potential employer transmits a search request 20 from the client terminal 2 to the recruitment broker 4. The search request may be in any appropriate format, for example as a response generated from a web form, or as an e-mail, or even as a telephone communication or other means of communication. The broker 4 transmits the search commands 22, 26 to the recruitment data provider systems 8, 10 as previously described. The search commands are in the form of a URL, containing the address of the database search server for each respective agent, followed by a '?' character, then followed by the search query for the database in question, in a format compatible with the relevant database server and database. Thus, for the same search request, different search commands are (usually) transmitted to different recruitment data provider systems. Multiple search terms are appended in the URL with predefined/predetermined search term separator characters, and the URL is transmitted via the HTTP protocol (although other protocols, such as e-mail, instant messaging, and so on may of course be used). The search query portion of the URL may be, for example, in the form of an SQL query, or may be in a proprietary format used by the relevant database server/database. Also as previously mentioned, the field names used in the search query are as provided by the recruitment data provider system during the registration process, and thus will (usually) differ between different search commands 22, 26. Other characteristics of the search commands may, for example, be specified by tie recruitment data provider system during the registration process.

Once the recruitment data provider system 8 has executed the received search command 22, it (as appropriate) collates, sorts and filters the search results, and transmits the search results 24 to the recruitment broker 4. In the case shown in FIG. 8, the search results 24 are provided in HTML format. The candidate characteristic data is identified by predetermined HTML tags (such as FIELD_AGE, FIELD_EXPERIENCE, and so on, as shown), but the document as a whole is (for example) provided in a form which may be directly displayed in an uncustomised web browser. As mentioned above, other forms of documents (such as XML documents, or e-mail, ftp, and so on, for example) may be used to transmit the search results 24. Further search results (not shown) may be received, and the search report data (also not shown), incorporating the candidate information contained in the search results, is subsequently transmitted to the client terminal 2 by the broker 4.

The search report data, subsequent requests for further information about selected candidates, and requests to contact the relevant recruitment agents about the same or different selected candidates, may also be provided in any number of appropriate formats, handled by e-mail applications, web browsers/servers, or other types of software or hardware. Further extensions to the recruitment search system, established with the registration of recruitment data provider systems/agents 8, 10 with the recruitment broker 4, such as the job advertisement and feedback/tracking systems mentioned above, may be provided.

Second and third embodiments, with particular application to the field of recruitment, will now be described with reference to FIGS. 9 and 10.

Figure 9:
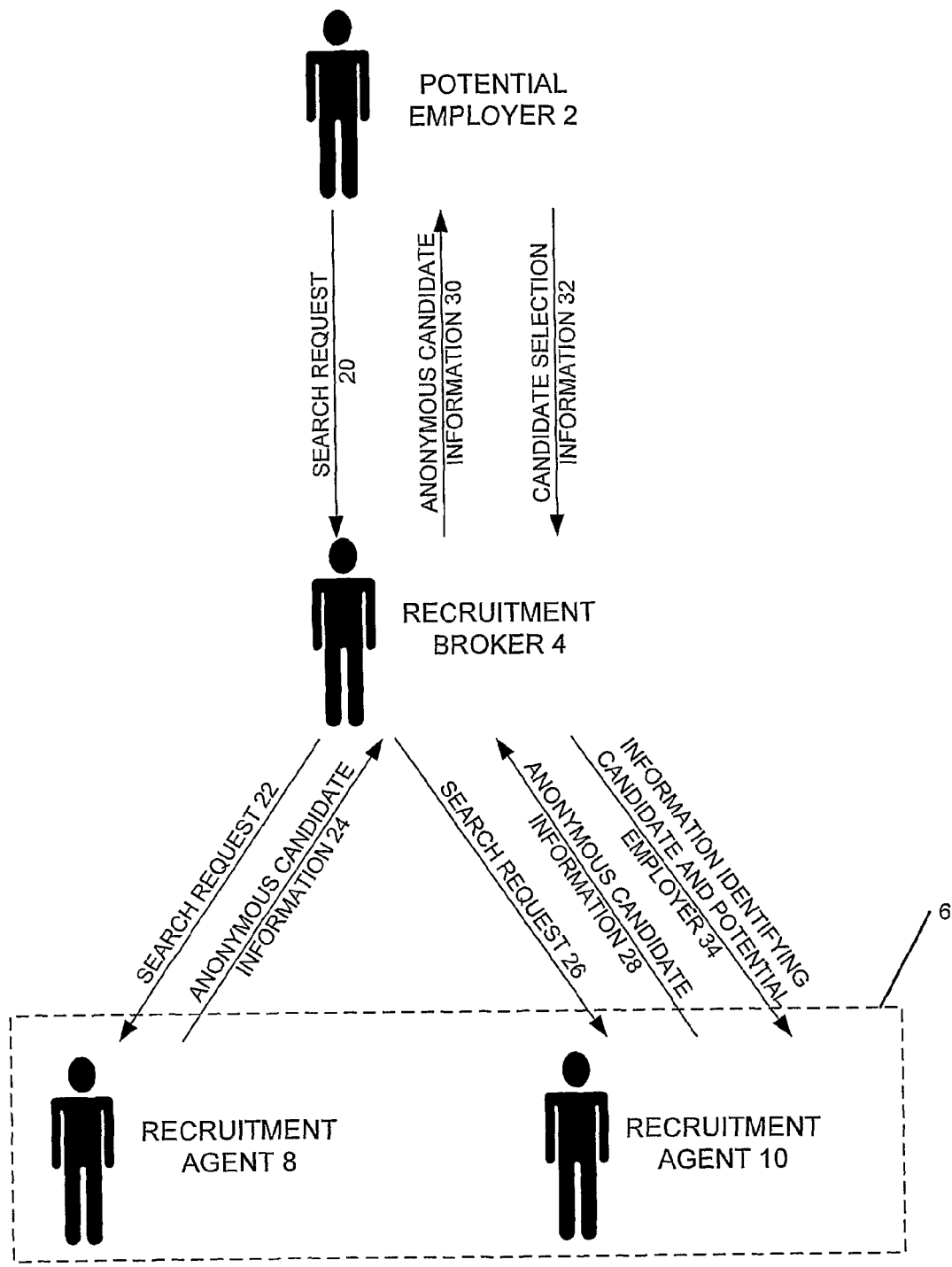
FIG. 9 is a schematic of a second embodiment of a method of searching for job candidates.

FIG. 9 shows a second embodiment of a searching method, involving a potential employer 2, a recruitment broker 4 and a plurality 6 of recruitment agents 8, 10. The employer passes to the recruitment broker 4 a search request 20 for prospective job candidates to fill a vacancy offered by the employer. The broker 4 passes search requests 22, 26 to respective recruitment agents 8, 10 for candidates fulfilling the specified criteria. Each agent 8, 10 then consults their records of prospective job candidates to identify suitable candidates, and passes the relevant information back to the recruitment broker 4 in the form of anonymous candidate information 24, 28. The recruitment broker 4 then, having regard to the plurality of anonymous candidate information 24, 28 which it has received, forwards further anonymous candidate information 30 to the potential employer 2, allowing the employer to select candidates from a single set of data (with the benefit of simplicity and efficiency compared to the situation where the employer had to consult each recruitment agent 8, 10 individually himself).

The potential employer then reviews the candidate information 30 to select particular candidate(s) of interest. This selection information 32 is then passed to the recruitment broker 4 who, having organised the recruitment searches conducted by each recruitment agent, is then able to select the recruitment agent(s) 10 responsible for the selected candidate(s). The broker 4 then passes to the selected recruitment agent 10 information identifying both the selected candidate(s) and the potential employer 2, enabling the recruitment agent 10 to contact the employer 2 directly with regard to the selected candidate. This provides the benefit that no identifiable (non-anonymous) candidate information is exchanged with the potential employer 2 except as and when the recruitment agent 10 chooses to do so directly, thus protecting the value of the recruitment records maintained by each recruitment agent.

Figure 10:
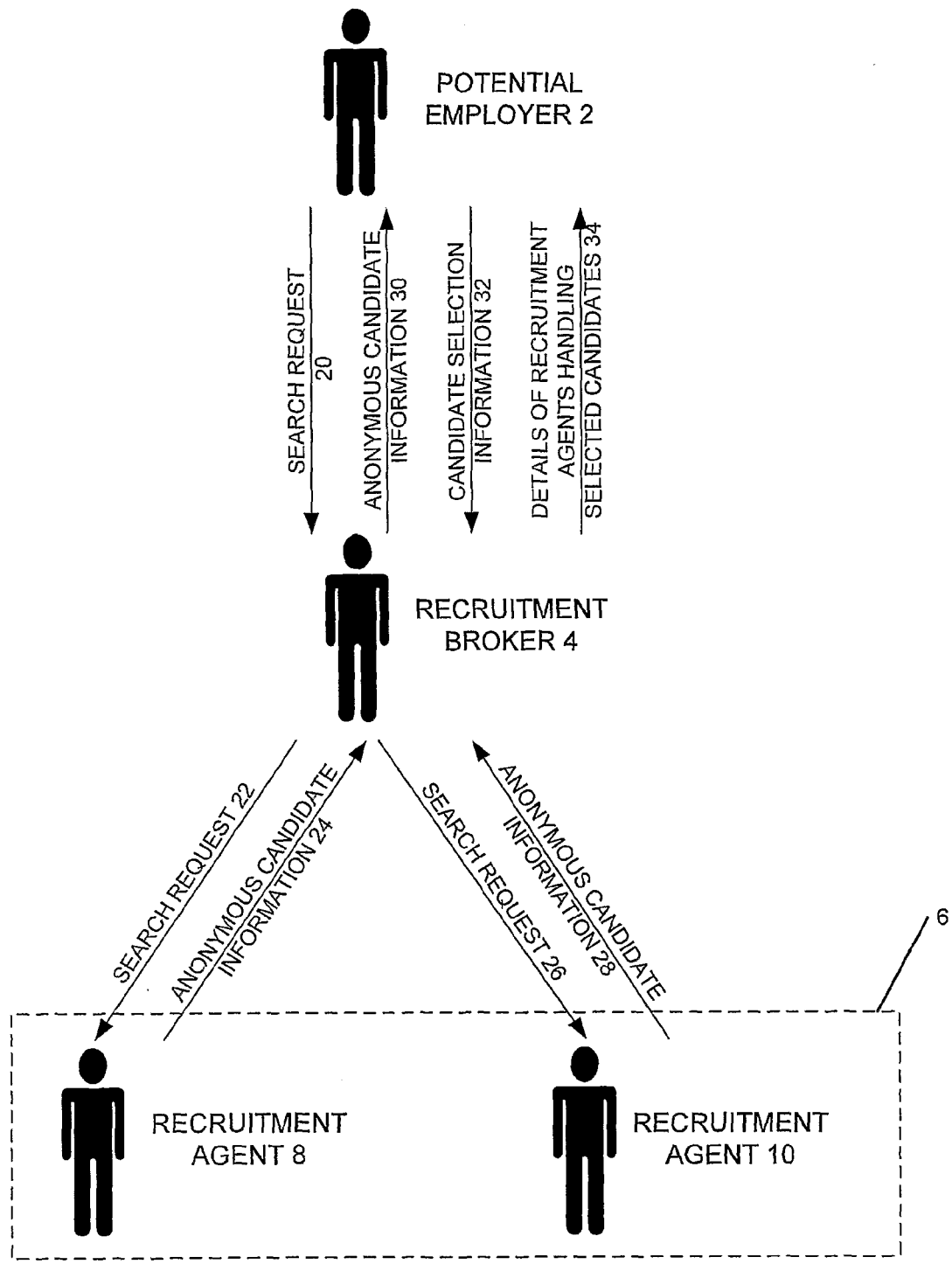
FIG. 10 is a schematic of a third embodiment of a method of searching for job candidates.

FIG. 10 shows a third embodiment of a searching method, involving a potential employer 2, a recruitment broker 4 and a plurality 6 of recruitment agents 8, 10. As before, the employer passes to the recruitment broker 4 a search request 20 for prospective job candidates to fill a vacancy offered by the employer, and the broker 4 passes search requests 22, 26 to respective recruitment agents 8, 10 for candidates fulfilling the specified criteria. Again, each agent 8, 10 then consults their records of prospective job candidates to identify suitable candidates, and passes the relevant information back to the recruitment broker 4 in the form of anonymous candidate information 24, 28. Yet again, the recruitment broker 4 then, having regard to the plurality of anonymous candidate information 24, 28 which it has received, forwards further anonymous candidate information 30 to the potential employer 2, allowing the employer to select candidates from a single set of data. Again, the potential employer reviews the candidate information 30 to select particular candidate(s) of interest, and passes selection information 32 to the recruitment broker 4.

In this embodiment, the broker 4 then passes back to the potential employer 2 details of the recruitment agent(s) 10 handling the selected candidates, so that the employer 2 can then follow-up the matter directly with the relevant recruitment agent(s). Optionally, uniquely identifying (but anonymous) information is also provided to the employer, in relation to each selected candidate, to facilitate the identification by the recruitment agent(s) of the candidates selected by the employer 2.

In a variant of the second and third embodiments, the candidate information passed to the recruitment broker 4 by the recruitment agents 8, 10 is not (necessarily) anonymous, and the recruitment broker 4 then filters the received information to remove identifiable candidate information before passing the information on to the potential employer 2, thus ultimately ensuring the desired candidate anonymity during the search process.

In a further variant of all of the embodiments, the system allows any number of recruitment agents to take out subscriptions and/or to make one-off payments in order to have data relating to their own candidates placed nearer the top of the list of search results, or otherwise to have their own candidates given higher priority.

Another variant of all of the embodiments allows for the selective transmission of job advertisements to relevant recruitment agents. Again, a system of subscriptions and/or one-off payments may be employed to allow recruitment agents to have a higher priority with respect to the advertisements, for example to allow the highest-paying agents first refusal of advertised positions, or to allow agents paying different amounts of money respective different amounts of advance warning of any job vacancies.

In the systems and methods described above, search results may be sorted by any relevant field or otherwise collated. The sorting may be performed by the search broker before the results are transmitted to the client, or they may be performed by or at the client. The field or fields used for sorting the data may be selected by the searcher, by the search broker, or by any other agent, for example.

Any of the potential employer 2, recruitment broker 4, and recruitment agents 8,10 may be provided with appropriate hardware and software means, such as computers, input devices, display devices, database and other servers, web browsers, e-mail applications, storage devices, network interfaces and local- or wide-area networks (such as the Internet) to facilitate the recruitment search system described above.

While the recruitment searching system has been described above with reference to potential employers conducting a search for prospective job candidates, it will be appreciated that the system may also be used, by appropriately applying the methods and systems described above, to allow prospective job candidates to conduct searches for job vacancies listed in the records of recruitment agencies. Further types of distributed searches, including more general searches and searches in different technical fields, may also be carried out using the methods and systems described herein.

The searching system described above may also be used in different fields, for example to allow anonymous searching of criminal databases (for example where different police forces within the same country each operate diverse non-centralised databases relating to suspect details and other information), census details, government or council databases, human resources (HR) databases within corporations, and so on.

The systems and methods described above may also be extended to provide local searching as well as remote searching, using a local database. Accordingly, whenever a search is conducted using remote databases provided at different parts of the network, a further search can be conducted on the local database, the local results then being pooled with the remote results. Data providers can export data to the local database on a periodic basis, for example, and thus can participate in the searches conducted by the search broker without having a network presence.

The searching systems and methods may be applied generally to form a community of restricted access databases. The term 'restricted access database' may apply, for example, to databases which are Internet-connectable but which do not permit unrestricted access to data stored within them, for example including databases which can be queried via the Internet but which cannot be indexed or crawled by 'web bots' and/or may not present a web-based search interface. In such a community, each database may have a data access policy which the owner of the database may wish to enforce. For example, recruitment agencies may have a data access policy that specifies that non-anonymous data may not be extracted and/or forwarded to a third party carrying out a search. Data policies may also restrict the maximum numbers of searches which may be carried out in a given time period, and so on.

In the community mentioned above, a central search service collects configuration data submitted by members of the community. The configuration data provides access details and configuration information for each database. The searching service then receives search requests from members of the public (or other external community) and interrogates each of the databases in accordance with the relevant data access policy, and aggregates the results (although the system may be applied to a community of only one member). The results are then returned to the invoker of the search, for example using methods and systems described above. In return for providing public access to the databases which would otherwise be unavailable to the public (or other external or 'untrusted' communities), the searching service may require that the members of the community adhere to a data maintenance policy, for example to carry out regular data cleansing and updating operations to ensure that the searched data does not become 'stale'.

In such an arrangement, improved results can be obtained compared to freely searchable databases and similar systems. In the field of recruitment, for example, public databases exist to which members of the public can submit resumés. In practice, once someone is hired, they typically do not go to the trouble of removing their resumé from the databases to which it has been submitted. The result of this is that a job search on public databases of resumés may return multiple copies of the same, out-dated resumé. Thus it can be very wasteful for companies to search public databases of resumés, because of the large number of 'false hits'.

By use of the searching service and community of databases mentioned above, companies can obtain access to a potentially better quality of data and a quality of service can optionally be enforced (via the data maintenance policy of the searching service, if applicable).

It will also be appreciated that whilst the embodiment described above is adapted for use with the Internet, it may also be applied to other types of network, such as intranets, extranets, wireless networks, and so on.

Further modifications lying within the spirit and scope of the present invention will be apparent to a skilled person in the art.

The invention claimed is:

1. A method of facilitating searching for data on a plurality of heterogeneous databases connected over a network to a central computer, the databases including at least one named data field, and the method comprising, at the central computer:
   receiving, via the network, registration data for each said database to register the database with the central computer to enable centralized searching of the data in each database;
   receiving as part of the registration data, via the network, mapping data for each database, the mapping data mapping each of a plurality of predefined search terms with each of a corresponding plurality of data field names in each database;
   receiving from a client terminal a search request for data;
   determining at least one said predefined search term from the received search request;
   for each of at least one database of the plurality of databases:
      processing the mapping data to select at least one data field name in the database, said at least one data field name corresponding to said at least one determined predefined search term;
      generating a search command compatible with the database using said at least one data field name;
      transmitting the search command over the network to a data provider system associated with the database; and
      receiving over the network from the data provider system search results resulting from the execution of the search command on the database;
      processing the search results received from said at least one data provider to generate search report data; and
      transmitting the search report data to the client terminal,
      wherein at least of the step of selecting at least one database and the step of generating a search command for said at least one database further comprises retrieving the mapping data from a configuration database containing a plurality of records, each record containing mapping data relating to a data provider system associated with one of the plurality of databases.

2. A method according to claim 1, wherein the mapping data is received from a corresponding at least one of the data provider systems.

3. A method according to claim 1, further comprising:
   receiving further mapping data in respect of a further database as part of received registration data for the database;
   storing the further mapping data; and
   including the further database in the plurality of databases.

4. A method according to claim 3, wherein the further mapping data includes mapping data associating search terms to named data fields in the further database.

5. A method according to claim 1, further comprising the steps of:
processing the search request received from the client terminal to determine criteria which data provider systems must meet; and
selecting at least one database from the plurality of databases in dependence on whether said at least one respective associated data provider system meets the determined criteria,
wherein said search commands are transmitted to data provider systems which meet the criteria.

6. A method according to claim 1, wherein the step of converting the received search request to a search command for said at least one database comprises building a search string, including a network address for accessing said at least one database and a set of search terms.

7. A method according to claim 1, wherein the step of receiving search results from the data provider system comprises receiving at least one document, and the step of processing the search results further comprises scanning said at least one document for at least one tag identifying the position of at least one respective type of result data.

8. A method according to claim 7, wherein the document is in a mark-up language format, and step of processing the search results comprises extracting result data from marked-up portions of said at least one document.

9. A method according to claim 8, further comprising processing tag mapping data, associating search terms with specific tags used by each respective data provider system, to select said at least one mark-up tags for scanning said at least one document.

10. A method according to claim 1, wherein the step of processing the search results comprises aggregating said at least one received search results into a single set of search results.

11. A method according to claim 10, wherein the step of processing the search results further comprises sorting the set of search results in accordance with sorting criteria.

12. A method according to claim 1, wherein the step of processing the search results comprises inserting the search results into a mark-up language document.

13. A method according to claim 1, further comprising the steps of:
receiving, from the client terminal, selection data relating to at least one record associated with the search report data transmitted to the client terminal;
processing the selection data to determine at least one data provider system associated with said at least one record;
transmitting identifying data to one of the client terminal and said at least one data provider system, the identifying data allowing the client terminal and said at least one data provider system to communicate directly with regard to records selected from the database associated with said at least one respective data provider system.

14. A method according to claim 13, the step of receiving search results from the data provider system further comprising receiving record identifiers, unique within the database associated with the data provider system, and wherein the identifying data includes said at least one record identifier for the relevant data provider system.

15. A method according to claim 1, the step of receiving search results from said at least one data provider system further comprising receiving a plurality of data fields in respect of each record, the search report data transmitted to the client terminal containing only a subset of the data fields, and the method further comprising
receiving a request from the client terminal for further information about at least one record;
generating a further report containing at least one data field absent from the first search report data; and
transmitting the further report to the client terminal.

16. A method according to claim 1, further comprising:
storing the received search results as records in a database, each record relating to a specific received record and including a record identifier for the received record and a data provider system identifier.

17. A method according to claim 1, further comprising:
receiving a request for data, the request including criteria for the data;
selecting at least one data provider system from the plurality of data provider systems associated with the respective plurality of databases; and
transmitting the request for data to said at least one selected data provider system.

18. Apparatus for facilitating searching for data on a plurality of heterogeneous databases connected over a network, the databases including at least one named data field, and the apparatus comprising:
means for receiving, via the network, registration data for each said database to register the database with the central computer to enable centralized searching of the data in each database;
means for receiving as part of the registration data, via the network, mapping data for of each database, the mapping data mapping each of a plurality of predefined search terms with each of a corresponding plurality of data field names in each database;
means for receiving from a client terminal a search request for data;
means for determining at least one said predefined search term from the received request for data;
means for processing the received search request and the mapping data to select at least one i database from the plurality of databases and to generate a search command compatible with said at least one selected database, the means for processing the received search request and the configuration data including:
means for processing the mapping data to select at least one data field name in each selected database, said at least one data field name corresponding to said at least one determined predefined search term; and
means for generating a search command using said at least one selected data field name;
means for transmitting said at least one generated search command over the network to said at least one respective data provider system associated with said at least one respective selected database;
means for receiving over the network from said at least one data provider system search results resulting from the execution of the search command on said at least one database;
means for processing the search results received from said at least one selected data provider system to generate search report data; and
means for transmitting the search report data to the client terminal,
wherein the means for processing the received search request is adapted to retrieve mapping data from a mapping database containing a plurality of records, each record containing mapping data relating to a data provider system associated with one of the plurality of databases.

19. Apparatus according to claim 18, further comprising means for receiving at least one portion of the mapping data as part of the registration data from a corresponding at least one of the data provider systems.

20. Apparatus according to claim 18, further comprising:
means for receiving further mapping data in respect of a further database; and
means for storing the further mapping data.

21. Apparatus according to claim 18, wherein the mapping data includes mapping data associating search terms to specific named data fields in the further database.

22. Apparatus according to claim 18, wherein the means for processing the received search request is further adapted to:
process the search request received from the client terminal to determine criteria which data provider systems must meet; and
select at least one database from the plurality of databases in dependence on whether said at least one respective associated data provider system meets the determined criteria,
wherein the apparatus is adapted to transmit said search commands to data provider systems which meet the criteria.

23. Apparatus according to claim 18, wherein the means for processing the received search request to generate a search command compatible with said at least one selected database is adapted to build a search string, including a network address for accessing said at least one selected database and a set of search terms.

24. Apparatus according to claim 18 wherein the means for receiving search results from the data provider system is adapted to receive at least one document, and the means for processing the search results is further adapted to scan said at least one document for at least one tag identifying the position of at least one respective type of result data.

25. Apparatus according to claim 24, the document being in a mark-up language format, and wherein the means for processing the search results is adapted to extract result data from marked-up portions of said at least one document.

26. Apparatus according to claim 25, further comprising means for processing tag mapping data, associating search terms with specific tags used by each respective data provider system, to select said at least one mark-up tags for scanning said at least one document.

27. Apparatus according to claim 18, wherein the means for processing the search results is adapted to aggregate said at least one received search results into a single set of search results.

28. A method according to claim 27, wherein the means for processing the search results is further adapted to sort the set of search results in accordance with sorting criteria.

29. Apparatus according to claim 18, wherein the means for processing the search results is adapted to insert the search results into a mark-up language document.

30. Apparatus according to claim 18, further comprising:
means for receiving, from the client terminal, selection data relating to at least one record associated with the search report data transmitted to the client terminal;
means for processing the selection data to determine at least one data provider system associated with said at least one record;
means for transmitting identifying data to one of the client terminal and said at least one data provider system, the identifying data allowing the client terminal and said at least one data provider system to communicate directly with regard to records selected from the database associated with said at least one respective data provider system.

31. Apparatus according to claim 30, the means for receiving search results from the data provider system being adapted to receive record identifiers, unique within the database associated with the data provider system, and wherein the identifying data includes said at least one record identifier for the relevant data provider system.

32. Apparatus according to claim 18, the means for receiving search results from said at least one data provider system being adapted to receive a plurality of data fields in respect of each record, the search report data transmitted to the client terminal containing only a subset of the data fields, and the apparatus further comprising
means for receiving a request from the client terminal for further information about at least one record;
means for generating a further report containing at least one data field absent from the first search report data; and
means for transmitting the further report to the client terminal.

33. Apparatus according to claim 18, further comprising:
means for storing the received search results as records in a database, each record relating to a specific record and including a record identifier for the received record and a data provider system identifier.

34. Apparatus according to claim 18, further, comprising:
means for receiving a request for data, the request including criteria for the data;
means for selecting at least one data provider system from the plurality of data provider systems associated with the respective plurality of databases; and
means for transmitting the request for data to said at least one selected data provider system.

35. Apparatus for facilitating searching for data on a plurality of heterogeneous databases connected over a network, the apparatus comprising:
a network interface; and
a processor;
wherein the network interface and processor are operable to:
receive, via the network, registration data for each said database to register the database with the central computer to enable centralized searching of the data in each database;
receive as part of the registration data, via the network, mapping data for each database, the mapping data mapping each of a plurality of predefined search terms with each of a corresponding plurality of data field names in each database;
receive from a client terminal a search request for data;
determine at least one said predefined search term from the received search request;
process the received search request and the mapping data to select at least one database from the plurality of databases, to select at least one data field name in each selected database, said at least one data field name corresponding to said at least one determined predefined search term, and to generate a search command compatible with said at least one selected database using said at least one selected data field name;
transmit said at least one generated search command over the network to said at least one respective data provider system associated with said at least one respective selected database;

receive over the network from said at least one data provider system search results resulting from the execution of the search command on said at least one database;

process the search results received from said at least one selected data provider system to generate search report data; and transmit the search report data to the client terminal, wherein the network interface and processor are further operable to retrieve mapping data from a mapping database containing a plurality of records, each record containing mapping data relating to a data provider system associated with one of the plurality of databases.

36. Apparatus for facilitating searching for data on a plurality of heterogeneous databases connected over a network, the databases including at least one named data field, the apparatus comprising:

a data memory operable to store data to be processed;

an instruction memory storing processor implementable instructions;

a processor operable to read and process the data in accordance with instructions stored in the instruction memory; and a network interface device;

wherein the instructions stored in the instruction memory comprise:

instructions for controlling the processor to control the network interface device to receive, via the network, registration data for each said database to register the database with the central computer to enable centralized searching of the data in each database;

instructions for controlling the processor to control the network interface device to receive, via the network, mapping data for each database, the mapping data mapping each of a plurality of predefined search terms with each of a corresponding plurality of data field names in each database;

instructions for controlling the processor to control the network interface device to receive from a client terminal a search request for data;

instructions for controlling the processor to determine at least one said predefined search term from the received search request;

instructions for controlling the processor to, for each of at least one database of the plurality of databases:

process the mapping data to select at least one data field name in the database, said at least one data field name corresponding to said at least one determined predefined search term;

generate a search command compatible with the selected database using said at least one data field name;

control the network interface device to transmit the search command over the network to a data provider system associated with the database; and control the network interface device to receive over the network from the data provider system search results resulting from the execution of the search command on the database;

instructions for controlling the processor to process the search results received from said at least one data provider to generate search report data; and instructions for controlling the processor to control the network interface device to transmit the search report data to the client terminal, wherein the instructions for controlling the processor to process the mapping data also includes instructions adapted to retrieve mapping data from a mapping database containing, a plurality of records, each record containing mapping data relating to a data provider system associated with one or the plurality of databases.

37. A non-transient storage medium storing computer readable code for controlling a computer to carry out a method of facilitating searching for data on a plurality of heterogeneous databases connected over a network, the databases including at least one named data field, and the computer readable code comprising:

code for controlling the computer to receive, via the network, registration data for each said database to register the database with the central computer to enable centralized searching of the data in each database;

code for controlling the computer to receive, via the network, mapping data for each database, the mapping data mapping each of a plurality of predefined search terms with each of a corresponding plurality of data field names in each database;

code for controlling the computer to receive from a client terminal a search request for data;

code for controlling the computer to determine at least one said predefined search terms from the received search request;

code for controlling the computer to, for each of at least one database Of the plurality of databases:

process the mapping data to select at least one data field name in the database, said at least one data field name corresponding to said at least one determined predefined search term;

generate a search command compatible with the selected database using said at least one data field name;

transmit the search command over the network to a data provider system associated with the database; and receive over the network from the data provider system search results resulting from the execution of the search command on the database;

code for controlling the computer to process the search results received from said at least one data provider to generate search report data; and code for controlling the computer to transmit the search report data to the client terminal, wherein the code for controlling the computer to process the mapping data also includes code adapted to retrieve mapping data from a mapping database containing a plurality of records, each record containing mapping data relating to a data provider system associated with one of the plurality of databases.

* * * * *